(12) United States Patent
Li et al.

(10) Patent No.: US 11,985,243 B2
(45) Date of Patent: May 14, 2024

(54) SECURE COMMUNICATION CHANNEL FOR OS ACCESS TO MANAGEMENT CONTROLLER

(71) Applicant: Dell Products L.P., Round Rock, TX (US)

(72) Inventors: Tianhe Li, Shanghai (CN); Zhuo Zhang, Shanghai (CN); Kai Zhou, Shanghai (CN); Lixia Hu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 342 days.

(21) Appl. No.: 17/567,007

(22) Filed: Dec. 31, 2021

(65) Prior Publication Data

US 2023/0198761 A1     Jun. 22, 2023

(30) Foreign Application Priority Data

Dec. 20, 2021   (CN) .......................... 202111566038.1

(51) Int. Cl.
   *H04L 9/32*     (2006.01)
(52) U.S. Cl.
   CPC .......... *H04L 9/3213* (2013.01); *H04L 9/3234* (2013.01)

(58) Field of Classification Search
None
See application file for complete search history.

(56) References Cited

U.S. PATENT DOCUMENTS

| 2011/0119477 | A1* | 5/2011 | Byun | G06F 15/177 713/2 |
| 2021/0064734 | A1* | 3/2021 | Chen | G06F 21/575 |

* cited by examiner

*Primary Examiner* — Arezoo Sherkat
(74) *Attorney, Agent, or Firm* — Jackson Walker L.L.P.

(57) ABSTRACT

An information handling system may include a host information handling system that is configured to execute a host operating system (OS), a management controller configured to provide out-of-band management of the information handling system, a cryptoprocessor, and a dual-port random-access memory (RAM). The information handling system may be configured to: generate, at the cryptoprocessor, a cryptographic key pair comprising a public key and a private key; transmit a token from the cryptoprocessor to the host information handling system, wherein the token is signed with the private key; transmit the public key from the cryptoprocessor to the dual-port RAM; transmit the public key from the dual-port RAM to the management controller; and based on a verification of the token with the public key, grant access to the management controller from the host OS.

18 Claims, 1 Drawing Sheet

SECURE COMMUNICATION CHANNEL FOR OS ACCESS TO MANAGEMENT CONTROLLER

TECHNICAL FIELD

The present disclosure relates in general to information handling systems, and more particularly to allowing secure access from a host system including an operating system (OS) to a management controller such as a baseboard management controller (BMC).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context, as well as in other contexts, management controllers may be used for various system management tasks. Redfish® is a communications standard designed to deliver simple and secure management functionality and is supported by many management controllers. To protect both the interface and the exchanged data, Redfish® provides authentication and encryption for server management over the network in modern datacenter environments.

However, the operating system (OS) installed locally on a host system of a server typically uses an in-band Keyboard Controller Style (KCS) interface to configure the management controller and/or set up Redfish® access authorization to the management controller. The KCS interface provides unauthenticated local access to the management controller. Accordingly, an attacker could leverage control of the host system (e.g., by booting into an OS installed on external removable storage) into control of the management controller via the KCS interface.

Accordingly, it would be advantageous to use a secure communication channel for OS (or hypervisor) access to a management controller, instead of the unauthenticated access provided via KCS. Embodiments of this disclosure may provide such a secure communication channel via the use of a cryptoprocessor such as a TPM cryptoprocessor, as discussed in more detail below.

It is to be noted that various elements discussed herein are described in the Redfish® Specification 1.14, released Sep. 22, 2021 (hereinafter, Redfish Specification), which is incorporated by reference in its entirety. One of ordinary skill in the art with the benefit of this disclosure will understand its applicability to other specifications (e.g., prior or successor versions of the Redfish Specification). Further, some embodiments may be applicable to different technologies other than Redfish®.

It is also to be noted that various elements discussed herein are described in Trusted Platform Module (TPM) Main Specification Level 2 Version 1.2, Revision 116, released Mar. 1, 2011 (hereinafter, TPM Specification), which is also incorporated by reference in its entirety. One of ordinary skill in the art with the benefit of this disclosure will understand its applicability to other specifications (e.g., prior or successor versions of the TPM Specification). Further, some embodiments may be applicable to different technologies other than TPM.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with securely accessing management controllers may be reduced or eliminated.

In accordance with embodiments of the present disclosure, an information handling system may include a host information handling system that is configured to execute a host operating system (OS), a management controller configured to provide out-of-band management of the information handling system, a cryptoprocessor, and a dual-port random-access memory (RAM). The information handling system may be configured to: generate, at the cryptoprocessor, a cryptographic key pair comprising a public key and a private key; transmit a token from the cryptoprocessor to the host information handling system, wherein the token is signed with the private key; transmit the public key from the cryptoprocessor to the dual-port RAM; transmit the public key from the dual-port RAM to the management controller; and based on a verification of the token with the public key, grant access to the management controller from the host OS.

In accordance with these and other embodiments of the present disclosure, a method may include generating, at a cryptoprocessor of an information handling system, a cryptographic key pair comprising a public key and a private key; transmitting a token from the cryptoprocessor to a host information handling system of the information handling system that is configured to execute a host operating system (OS), wherein the token is signed with the private key; transmitting the public key from the cryptoprocessor to a dual-port random-access memory (RAM) of the information handling system; transmitting the public key from the dual-port RAM to a management controller that is configured to provide out-of-band management of the information handling system; and based on a verification of the token with the public key, granting access to the management controller from the host OS.

In accordance with these and other embodiments of the present disclosure, an article of manufacture may include a non-transitory, computer-readable medium having computer-executable instructions thereon that are executable by a processor of an information handling system for: generating, at a cryptoprocessor of the information handling system, a cryptographic key pair comprising a public key and a private key; transmitting a token from the cryptoprocessor to a host information handling system of the information handling system that is configured to execute a host operating system (OS), wherein the token is signed with the private key; transmitting the public key from the cryptoprocessor to a dual-port random-access memory (RAM) of the information handling system; transmitting the public key from the dual-port RAM to a management controller configured to provide out-of-band management of the information handling system; and based on a verification of the token with the public key, granting access to the management controller from the host OS.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
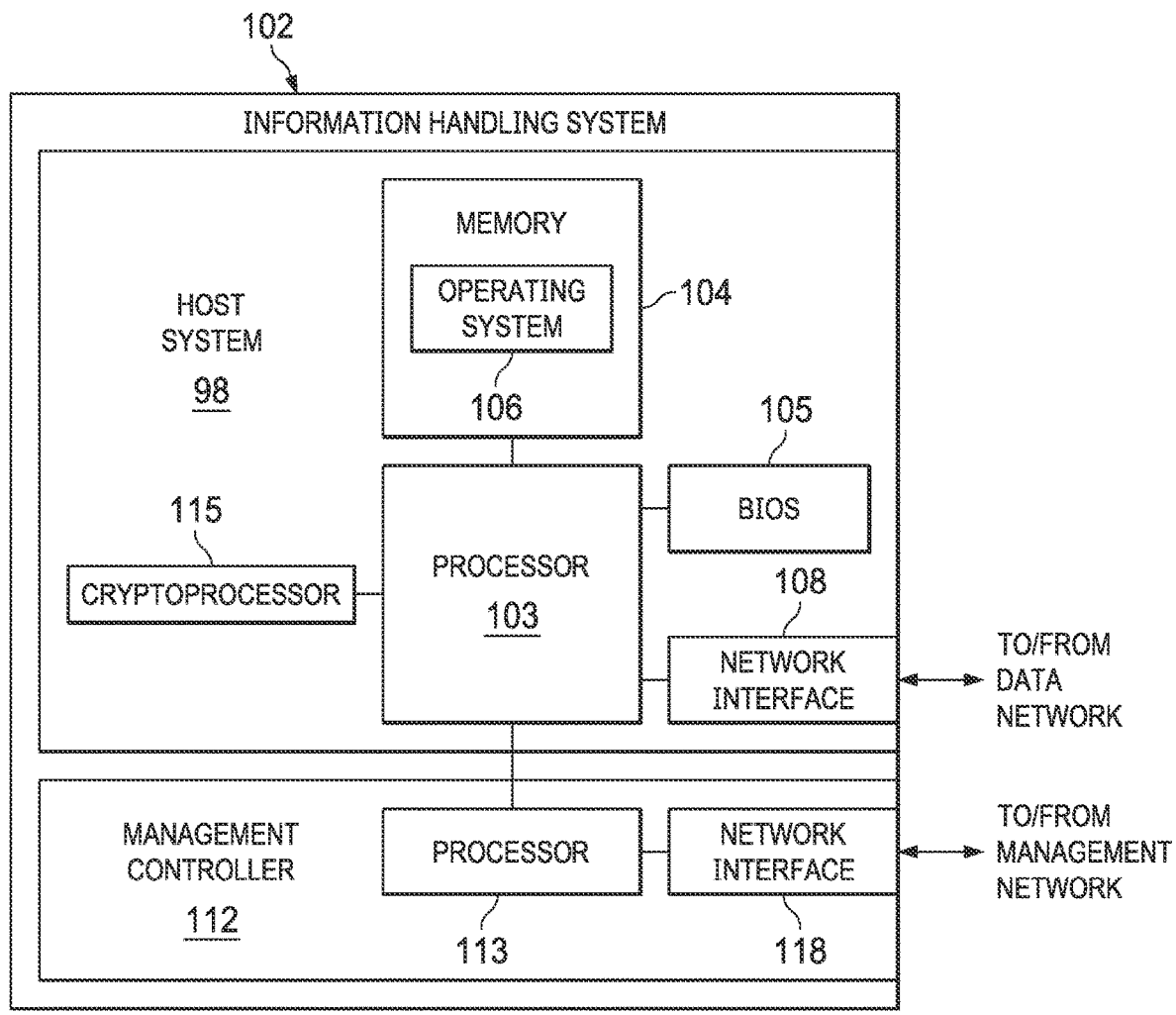
FIG. 1 illustrates a block diagram of an example information handling system, in accordance with embodiments of the present disclosure.
Figure 2:
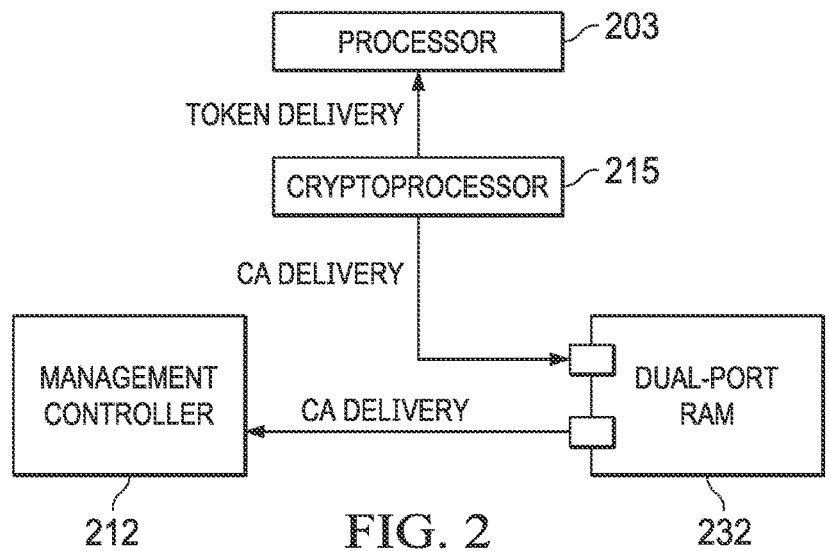
FIG. 2 illustrates a block diagram of selected components of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/ or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/ or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Cryptoprocessor 115 may be communicatively coupled to processor 103 and/or BIOS 105 (e.g., via a suitable communication bus) and may include any system, device, or apparatus configured to carry out cryptographic operations on data communicated to it from processor 103, BIOS 105, and/or another component of information handling system 102. In some embodiments, cryptoprocessor 115 may be compliant with the TPM Specification, a prior or successor specification, and/or any other similar specification. In some embodiments, cryptoprocessor 115 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys).

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, processor 103 of host system 98 may use an unauthenticated KCS interface to access processor 113 of management controller 112 in some embodiments. It would be advantageous to replace this unauthenticated communication channel with a more secure channel. For example, in some embodiments, the unauthenticated KCS interface may be disabled or removed, and access may be allowed only via the more secure channel.

Accordingly, embodiments of this disclosure may include an additional component such as a dual-port RAM chip to intermediate between host system 98 and management controller 112. For purposes of this disclosure, the term dual-port RAM refers to a device that includes random-access memory that allows multiple reads or writes to occur at the same or substantially the same time, unlike single-ported RAM which allows only one access at a time. Typically, dual-port RAM includes circuitry and/or logic for being communicatively coupled to more than one device, such that multiple devices can access the dual-port RAM simultaneously.

FIG. 2 illustrates selected components of such as embodiment. Processor 203 of a host system is coupled via a cryptoprocessor 215 to a dual-port RAM 232. Dual-port RAM 232 is also coupled to management controller 212 (e.g., to a processor of management controller 212). Dual-port RAM 232 may be implemented as a chip disposed within the host system (e.g., on the motherboard of the host system), within management controller 212, or in any other suitable location.

Dual-port RAM 232 may be used to exchange certificate authority (CA) information between cryptoprocessor 215 and management controller 212. In this way, a trusted communication channel may be established to allow Redfish® control of management controller 212 from an OS executing on processor 203.

By leveraging this trusted channel created for secure communication, the OS may create Redfish® access credentials via a specially designed Redfish® application programming interface (API). The new Redfish® access credentials may then be used to access any other available Redfish® APIs.

In particular, the following steps may be used in some embodiments to establish a trusted channel between the OS and management controller 212.

A certificate authority (e.g., including public and private keys or any other suitable encryption infrastructure) may be established as shown in FIG. 2. For example, each time the host system is booted, host processor 203 may send one or more commands (e.g., commands in accordance with the TPM specification) configured to cause cryptoprocessor 215 to establish a CA. The created CA information (e.g., the public key of a key pair) may then be transmitted to dual-port RAM 232. Management controller 212 may then fetch the CA information from dual-port RAM 232 and install the CA for Redfish® access. Dual-port RAM 232 may be configured such that management controller 212 has read-only access in some embodiments.

Once the trusted channel is established, the following steps may be used to use the trusted channel for access from the OS to the Redfish® API of management controller 212.

The host OS executing on processor 203 may send one or more commands (e.g., commands in accordance with the TPM Specification) configured to cause cryptoprocessor 215 to issue an access token to the OS. Cryptoprocessor 215 may produce and return an access token that is signed by cryptoprocessor 215 with the private key associated with the CA. The private key of the CA is protected by cryptoprocessor 215, and it need never be exposed outside of cryptoprocessor 215. For purposes of this disclosure, the term token may refer to any element of information (e.g., a character string) usable for identification and/or access purposes. For example, in one embodiment, the token may be a JavaScript Object Notation (JSON) Web Token (JWT).

Using the token received from cryptoprocessor 215, host processor 203 may access a Redfish® API (see Table 1 below) with the token to create a new account (e.g., with randomly or pseudo-randomly generated account credentials) on management controller 212. Management controller 212 may verify the token with the CA by checking the token's signature against the public key that it has retrieved from dual-port RAM 232, creating the new account if the token verification succeeds.

TABLE 1

Redfish ® API: Redfish ® Credential Service API

| | |
|---|---|
| Description | This API method is used to create or update a management controller Redfish ® access account for Redfish ® API access. This API is designed such that no credential is required to access this API itself. |

TABLE 1-continued

Redfish ® API: Redfish ® Credential Service API

| | |
|---|---|
| URL | /redfish/v1/OEM/CredentialService/token |
| Supported HTTP Method | POST |
| Privileges | ConfigureManager |
| Parameters | {<br>  'Token': '{token}',<br>  'Username': {Username for management controller credential}<br>  'Password': {base64 encoded password}<br>} |
| HTTP Status Code | 200 Success<br>401 Unauthorized. Return 401 for token validation failure. |

In some embodiments, when the host system including processor 203 is rebooted, dual-port RAM 232 may be cleared. This may further enhance the security benefits of such embodiments.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:
1. An information handling system comprising:
a host information handling system that is configured to execute a host operating system (OS);
a management controller configured to provide out-of-band management of the information handling system;
a cryptoprocessor; and
a dual-port random-access memory (RAM);
wherein the information handling system is configured to:
generate, at the cryptoprocessor, a cryptographic key pair comprising a public key and a private key;

transmit a token from the cryptoprocessor to the host information handling system, wherein the token is signed with the private key;
transmit the public key from the cryptoprocessor to the dual-port RAM;
transmit the public key from the dual-port RAM to the management controller; and
based on a verification of the token with the public key, grant access to the management controller from the host OS.

2. The information handling system of claim 1, wherein granting the access includes generating a new user account at the management controller.

3. The information handling system of claim 2, wherein the new user account is a Redfish account.

4. The information handling system of claim 1, wherein the management controller is a baseboard management controller (BMC).

5. The information handling system of claim 1, wherein the management controller is not controllable from the host information handling system via any un-authenticated communication channel.

6. The information handling system of claim 1, wherein the token is a JavaScript Object Notation (JSON) Web Token (JWT).

7. A method comprising:
generating, at a cryptoprocessor of an information handling system, a cryptographic key pair comprising a public key and a private key;
transmitting a token from the cryptoprocessor to a host information handling system of the information handling system that is configured to execute a host operating system (OS), wherein the token is signed with the private key;
transmitting the public key from the cryptoprocessor to a dual-port random-access memory (RAM) of the information handling system;
transmitting the public key from the dual-port RAM to a management controller that is configured to provide out-of-band management of the information handling system; and
based on a verification of the token with the public key, granting access to the management controller from the host OS.

8. The method of claim 7, wherein granting the access includes generating a new user account at the management controller.

9. The method of claim 8, wherein the new user account is a Redfish account.

10. The method of claim 7, wherein the management controller is a baseboard management controller (BMC).

11. The method of claim 7, wherein the management controller is not controllable from the host information handling system via any un-authenticated communication channel.

12. The method of claim 7, wherein the token is a JavaScript Object Notation (JSON) Web Token (JWT).

13. An article of manufacture comprising a non-transitory, computer-readable medium having computer-executable instructions thereon that are executable by a processor of an information handling system for:
generating, at a cryptoprocessor of the information handling system, a cryptographic key pair comprising a public key and a private key;
transmitting a token from the cryptoprocessor to a host information handling system of the information handling system that is configured to execute a host operating system (OS), wherein the token is signed with the private key;
transmitting the public key from the cryptoprocessor to a dual-port random-access memory (RAM) of the information handling system;
transmitting the public key from the dual-port RAM to a management controller configured to provide out-of-band management of the information handling system; and
based on a verification of the token with the public key, granting access to the management controller from the host OS.

14. The article of claim 13, wherein granting the access includes generating a new user account at the management controller.

15. The article of claim 14, wherein the new user account is a Redfish account.

16. The article of claim 13, wherein the management controller is a baseboard management controller (BMC).

17. The article of claim 13, wherein the management controller is not controllable from the host information handling system via any un-authenticated communication channel.

18. The article of claim 13, wherein the token is a JavaScript Object Notation (JSON) Web Token (JWT).

* * * * *